Jan. 16, 1962 C. SCHRAMM 3,016,550
BOOK FORMING AND PRESSING MACHINE
Filed July 28, 1958 7 Sheets-Sheet 2

INVENTOR.
CARL SCHRAMM
BY Teller & McCormick
ATTORNEYS

Jan. 16, 1962  C. SCHRAMM  3,016,550
BOOK FORMING AND PRESSING MACHINE
Filed July 28, 1958  7 Sheets-Sheet 3

INVENTOR.
CARL SCHRAMM
BY Teller & McCormick
ATTORNEYS

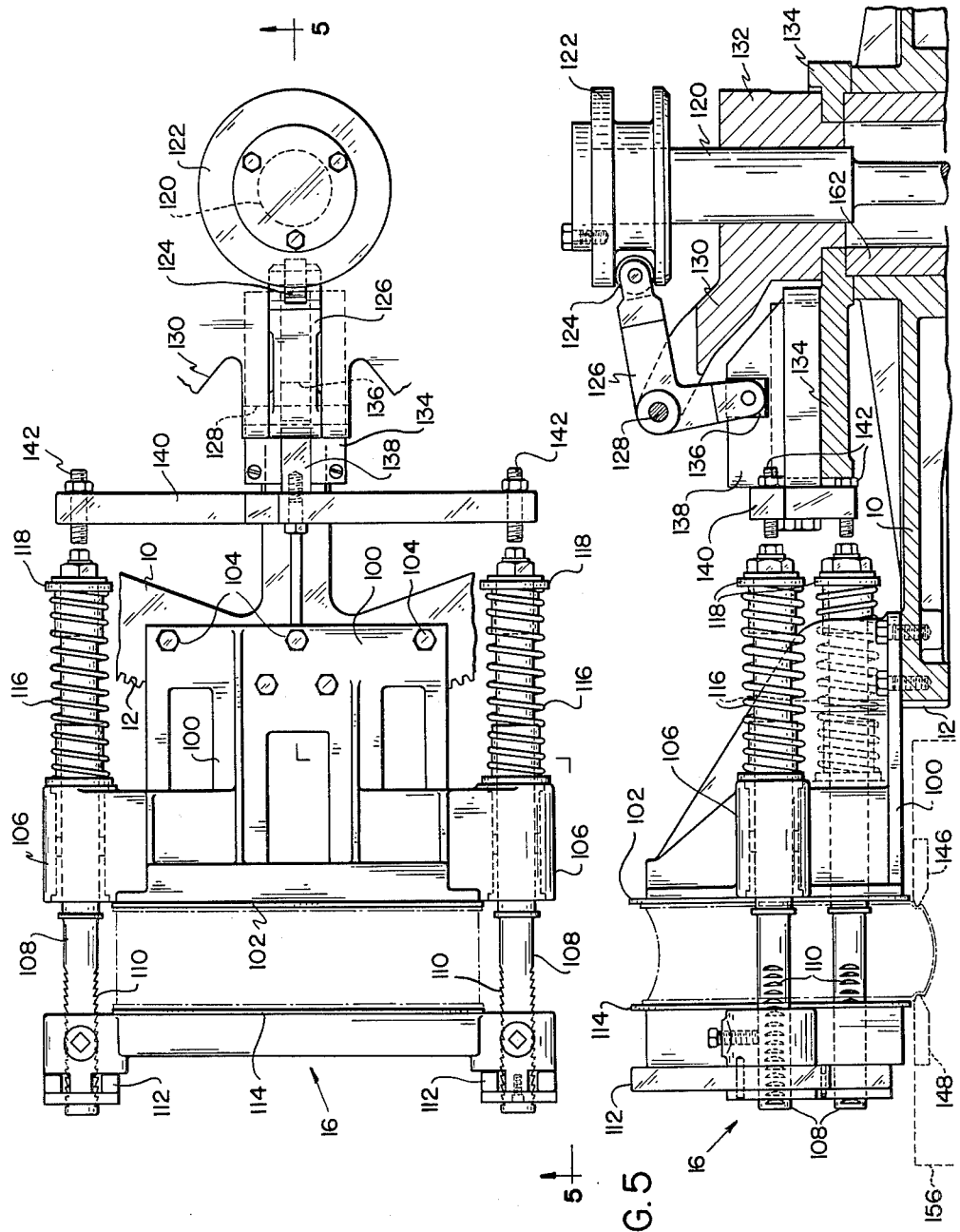

Jan. 16, 1962 C. SCHRAMM 3,016,550
BOOK FORMING AND PRESSING MACHINE
Filed July 28, 1958 7 Sheets-Sheet 5
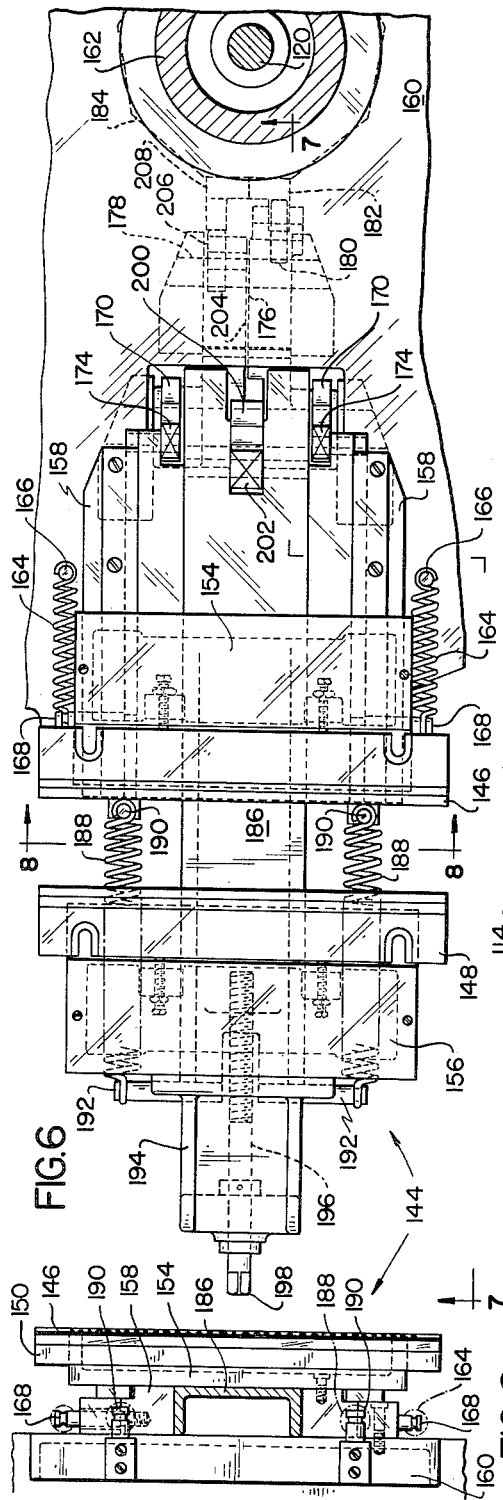
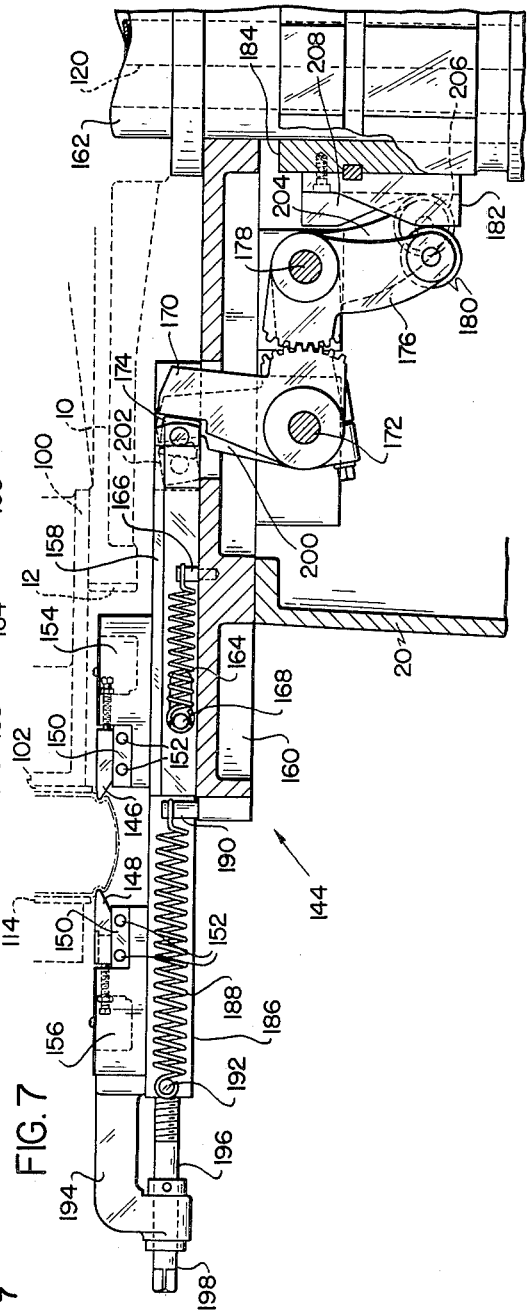
INVENTOR.
CARL SCHRAMM
BY Teller & McCormick
ATTORNEYS Jan. 16, 1962 C. SCHRAMM 3,016,550
BOOK FORMING AND PRESSING MACHINE
Filed July 28, 1958 7 Sheets-Sheet 6
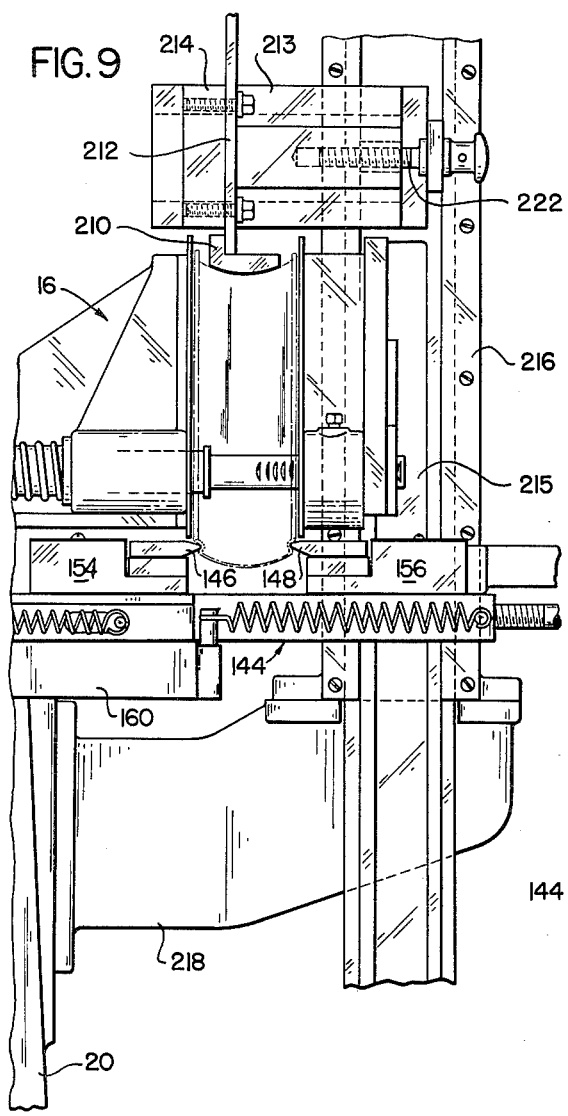
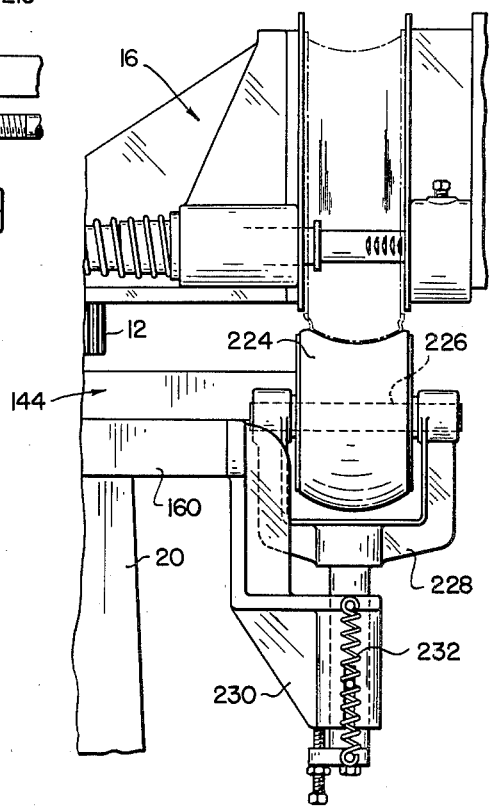
INVENTOR.
CARL SCHRAMM
BY Teller & McCormick
ATTORNEYS Jan. 16, 1962   C. SCHRAMM   3,016,550
BOOK FORMING AND PRESSING MACHINE
Filed July 28, 1958   7 Sheets-Sheet 7

INVENTOR.
CARL SCHRAMM
BY Teller & McCormick
ATTORNEYS

United States Patent Office 3,016,550
Patented Jan. 16, 1962

3,016,550
BOOK FORMING AND PRESSING MACHINE
Carl Schramm, North Coventry, Conn., assignor to The Smyth Manufacturing Company, Hartford, Conn., a corporation of Connecticut
Filed July 28, 1958, Ser. No. 751,452
18 Claims. (Cl. 11—1)

This invention relates to an improved fully automatic machine for forming and pressing books after their covers have been secured as by pasting but before the paste has fully set.

It is the general object of the invention to provide a far more compact book forming and pressing machine than has heretofore been known and one which will handle books varying within a relatively wide range as to cover size and bulk or thickness and which will even handle rough trimmed books.

A more specific object of the invention is to provide a machine of the aforementioned type capable of efficient high speed operation, but which nonetheless retains each book for a time sufficient to assure drying or setting of the paste securing the cover to the book and during which time continuous pressure is applied to the cover over substantially the entire surface of the end sheets while intermittent pressure and controlled heat are applied to the joint area and while intermittent pressure is applied to the cover along the backstrip or center board area thereof.

A further object is to provide a rotary type machine, i.e., one which moves the books from station to station in a circular path so as to save the greatest possible space and to provide convenience for the machine operator in observing all stations of machine operation. Further, it is believed that the rotary type machine provided in accordance with this invention will be more durable and foolproof in operation than other machines for the same or similar purposes due to the simplicity of the drive structure and due also to change in form of the book handling mechanism.

The drawings show a preferred embodiment of the invention and such embodiment will be described, but it will be understood that various changes may be made from the construction disclosed and that the drawings and description are not to be construed as defining or limiting the scope of the invention, the claims forming a part of this specification being relied upon for that purpose.

Of the drawings:

FIG. 4 is an enlarged plan view of a presser unit shown in greater detail than in FIG. 1;

FIG. 5 is a vertical sectional view taken on a radial plane through the machine turret, but showing a presser unit in elevation as from one side thereof, the view being taken generally as indicated by the line 5—5 of FIGS. 1 and 4;

FIG. 6 is a plan view of a creaser unit;

FIG. 7 is a vertical sectional view taken in a radial plane through the machine frame structure but showing a creaser unit in elevation as from one side thereof, the view being taken generally as indicated by the line 7—7 of FIGS. 1 and 6;

FIG. 8 is a transverse sectional view through a creaser unit, the view being taken as indicated generally by the line 8—8 of FIG. 6;

FIG. 9 is a fragmentary side elevational view of a presser unit and the creasing unit located at the station wherein the book is formed, part of the view being taken as indicated by line 9—9 of FIG. 1 and part of the view being taken as indicated by the line 9a—9a of FIG. 1;

FIG. 10 is a side elevational view of a presser unit located over a roller which applies pressure to the backstrip area of the cover of the book held within the said unit, the view being taken as shown by the line 10—10 of FIG. 1.

*The general arrangement*

As will be described in greater detail hereinafter, the automatic book forming and pressing machine provided in accordance with the present invention features a turret which is rotatable on a vertical axis. The turret mounts a plurality (preferably 9) of book clamping or presser units which are equally circumaxially spaced thereon, and the turret is indexed in movement through a plurality of stations (preferably 9). The turret is moved in one direction only, that being counterclockwise as viewed from the top thereof. In the aforedescribed intermittent movement of the turret, each of the aforesaid presser units is moved or indexed from one precise position or station to the next adjacent station until each of the presser units has been located at and passed each of the stations. The said stations are equally circumaxially spaced or located around the axis of the turret, and the turret stops at each station so that a presser unit will remain at rest for a selected interval at each of the plurality of stations. In other words, when there are nine presser units and 9 stations provided as in the preferred form to be described, the turret will complete one-ninth of a revolution in each indexed movement thereof, it being necessary to move the turret through nine steps to complete one revolution.

As will also be described, suitable means are provided to feed a succession of books in timed sequence to a loading mechanism which is capable of elevating a book to a position where it is engaged and clamped by a presser unit located at what may be referred to as the loading station of the turret. Then, in the next indexed movement of the turret, the presser unit is moved with the book retained therein from the loading station to a forming station wherein the book is formed as desired. At this second or forming station, a creaser unit engages the book joints for the first time and heat is applied to the joint area. Then, the presser unit in timed indexed movement and with the book retained therein stops at six consecutive stations wherein additional creaser units engage the book joints and apply heat thereto. However, the pressure applied by the clamping and presser unit is continuous from the said second station through the next six stations. Finally, the presser unit and retained book are indexed to the last or unloading station wherein the clamping plates or jaws of the presser unit are opened and the book is ejected from the machine. In passing through the six consecutive stations following the book forming station, the presser unit carries the book over a plurality of rolls which apply pressure to the backstrip area of the book cover. In the preferred form, three such rolls are provided.

Figure 11:
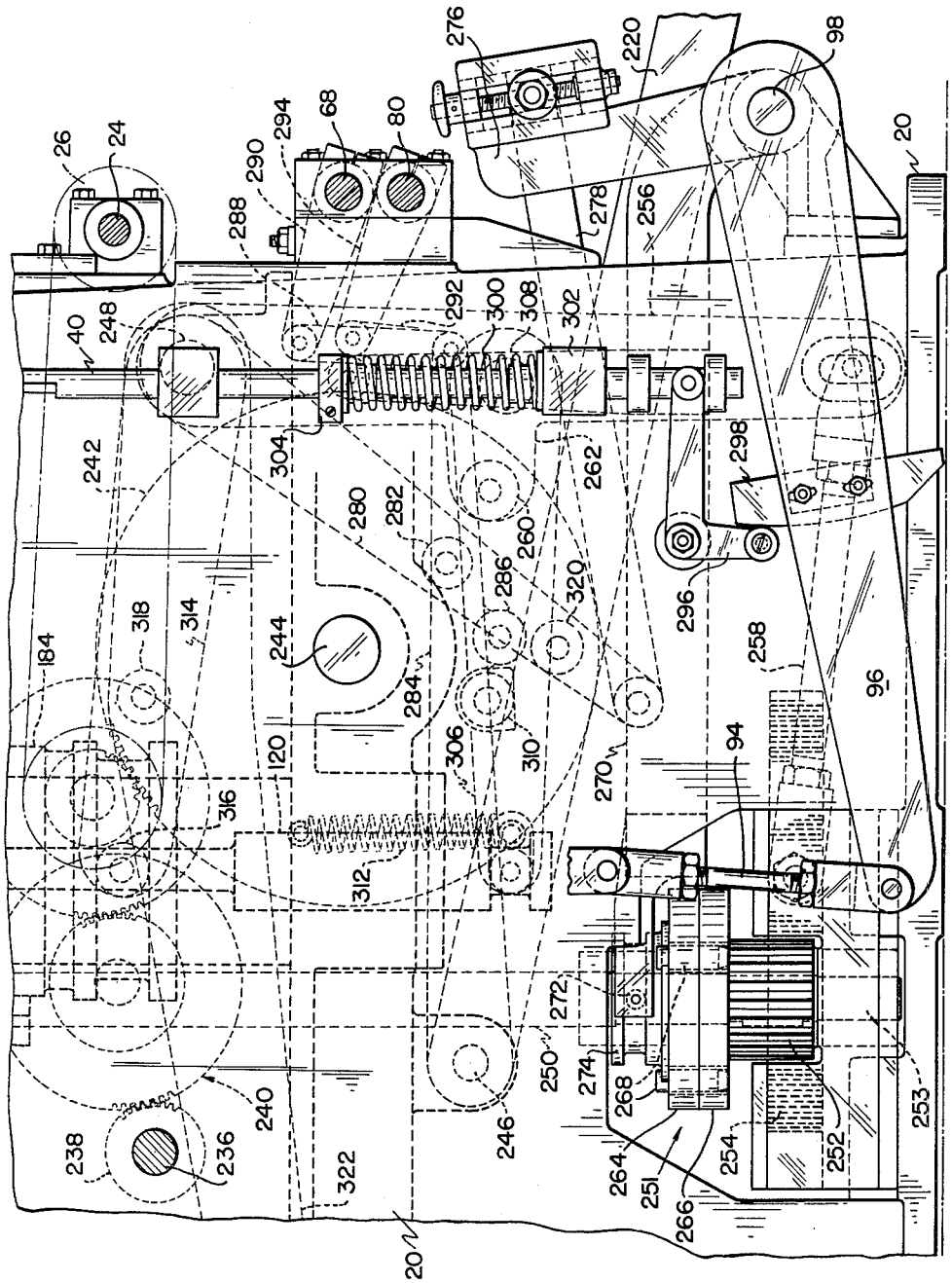
FIG. 11 is a fragmentary elevational view of the machine illustrating some of the details of the driving mechanism therefor.

The machine is preferably electric motor driven and the drive mechanism includes a driven cam shaft upon which a plurality of cams are mounted to operate levers which in turn operate the various mechanisms of the machine such as the turret, the loading mechanism, the presser and creaser units, the forming mechanism, the unloading mechanism, etc., all of which must be operated in timed relationship. The essence of the invention is not involved in the details of the drive mechanism and only so much thereof is shown in FIG. 11 as may be necessary to describe the general operation of the machine. Frequent reference will be made to FIG. 11 in describing the various mechanisms incorporated in the machine construction.

While the foregoing general description traces the movements of one book in the machine, it is to be understood that a succession of books are acted upon by the machine at each of the stations and that each of the nine presser units carries a book which it receives at the loading station and releases at the unloading station.

The turret and its stations

Figure 1:
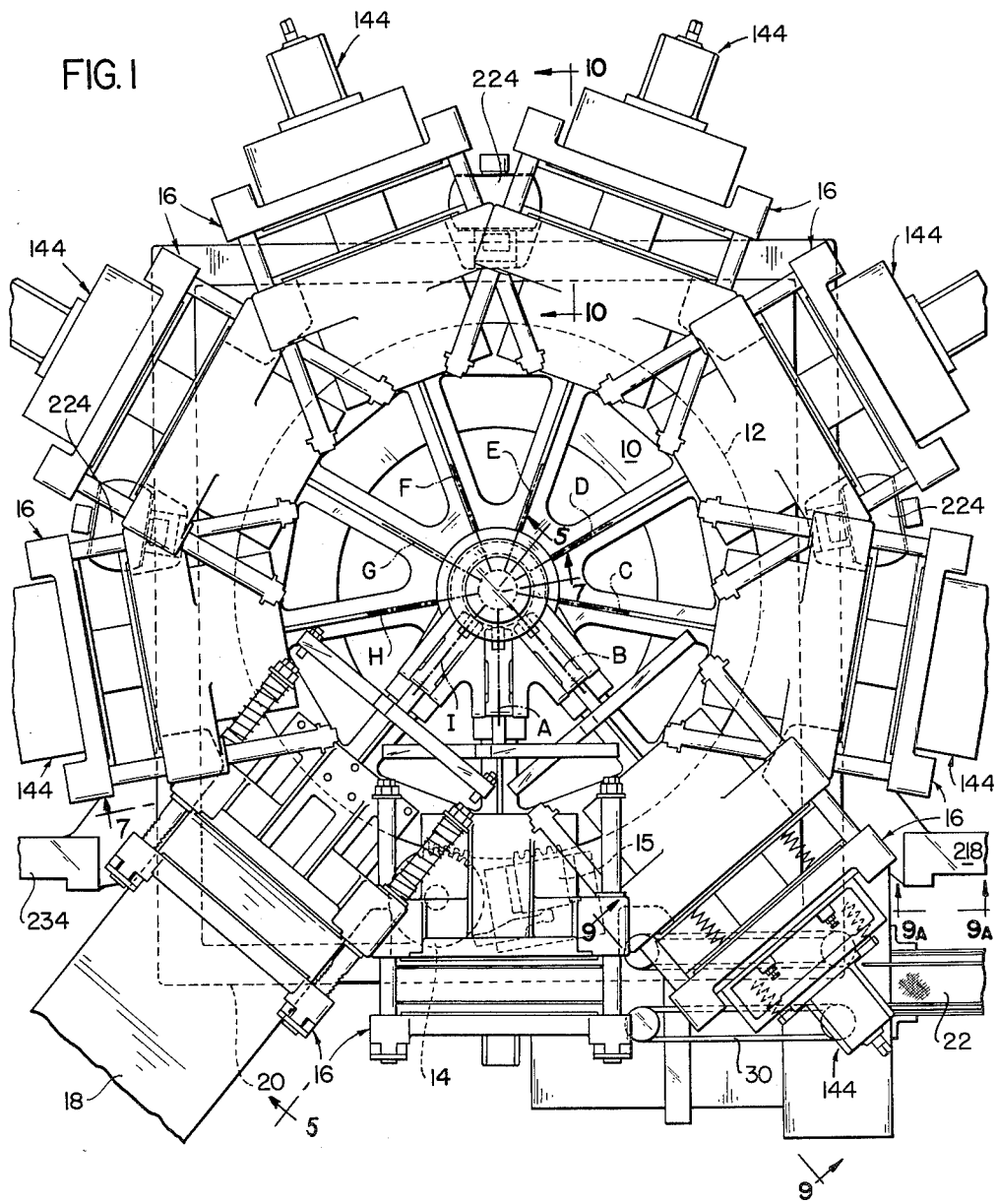
FIG. 1 is a plan view of the machine which shows the various stations to which the books are indexed by the rotary turret; the presser units being shown in outline without attention to detail.

As previously mentioned, FIG. 1 of the drawings is a plan view of the machine wherein the turret structure can best be observed. The turret per se comprises a large toothed wheel or gear 10 which rotates in a horizontal plane about a substantially vertical axis, the gear teeth being formed on the rim or periphery 12 to provide engagement with a driving pinion 14. The turret drive will be more fully described hereinafter but it is to be understood that the pinion 14 is rotated intermittently to index the turret 10 through nine stations, stopping at each station.

It is, of course, desirable to locate the rotated position of the turret precisely at each of its said stations. There are probably many devices or mechanisms acceptable for this purpose, one such device being indicated generally by the reference numeral 15. The locating device 15 comprises a toothed block which is reciprocable on fixed frame structure to effect engagement and disengagement of its teeth with the teeth on the turret. The locating block 15 is operated by means (not shown) to engage the turret immediately after movement thereof by the driving pinion 14 and to disengage the turret and block prior to the next movement of the turret. The pinion will rotate the turret to substantially the proper location, and then the engagement of the teeth on the turret and on the locating block will adjust the position of the turret to the precise location at each station.

In FIG. 1, the stations to which the turret is indexed are designated by the letters A through I, and it will be observed by reference to the broken lines designating the radial locations of the stations that the said stations are equally spaced around the turret's axis. The turret structure also includes a plurality of presser units 16, 16, there being nine such units secured to the turret 10 and corresponding in number to the stations of turret movement. In operation of the turret, a presser unit 16 is located precisely at each of the stations A through I when the turret is at rest, and each presser unit 16 is indexed from station to station in movement of the turret.

The A station may hereinafter be referred to as the loading station, because it is at this station where a presser unit 16 first receives and engages a book which is to be formed and pressed. The B station may be referred to as the forming station, because it is at this location where the book is formed, the presser unit receiving the book at the loading station being moved to the B or forming station in the first step of turret movement. Also, at the B station a creaser unit engages the book joints, applying heat and pressure thereto. The stations C through H are reached in sequence by the presser unit leaving the B station or forming station and at each of the stations C through H, creaser units engage the joint area of the book to apply heat and pressure thereto while continuous pressure is applied by the presser unit at each station and during movement of the turret from station to station.

When the presser unit reaches the last station I, it is opened to release the book which falls onto a chute 18, and the I station may hereinafter be referred to as the unloading station. The presser unit in the next indexed movement of the turret moves from the unloading station I to the loading station A.

The machine operator will usually stand adjacent the loading station A from which position all stations can conveniently be observed and from which position he has the best observation of the loading of the books into the machine and the unloading of the books from the machine. For convenient reference, it may be said that the operator stands at the front of the machine. The machine frame 20 is generally rectangular, and the turret structure rotates in a plane between waist and shoulder height on the average man.

The book feeding and loading mechanisms

Figure 2:
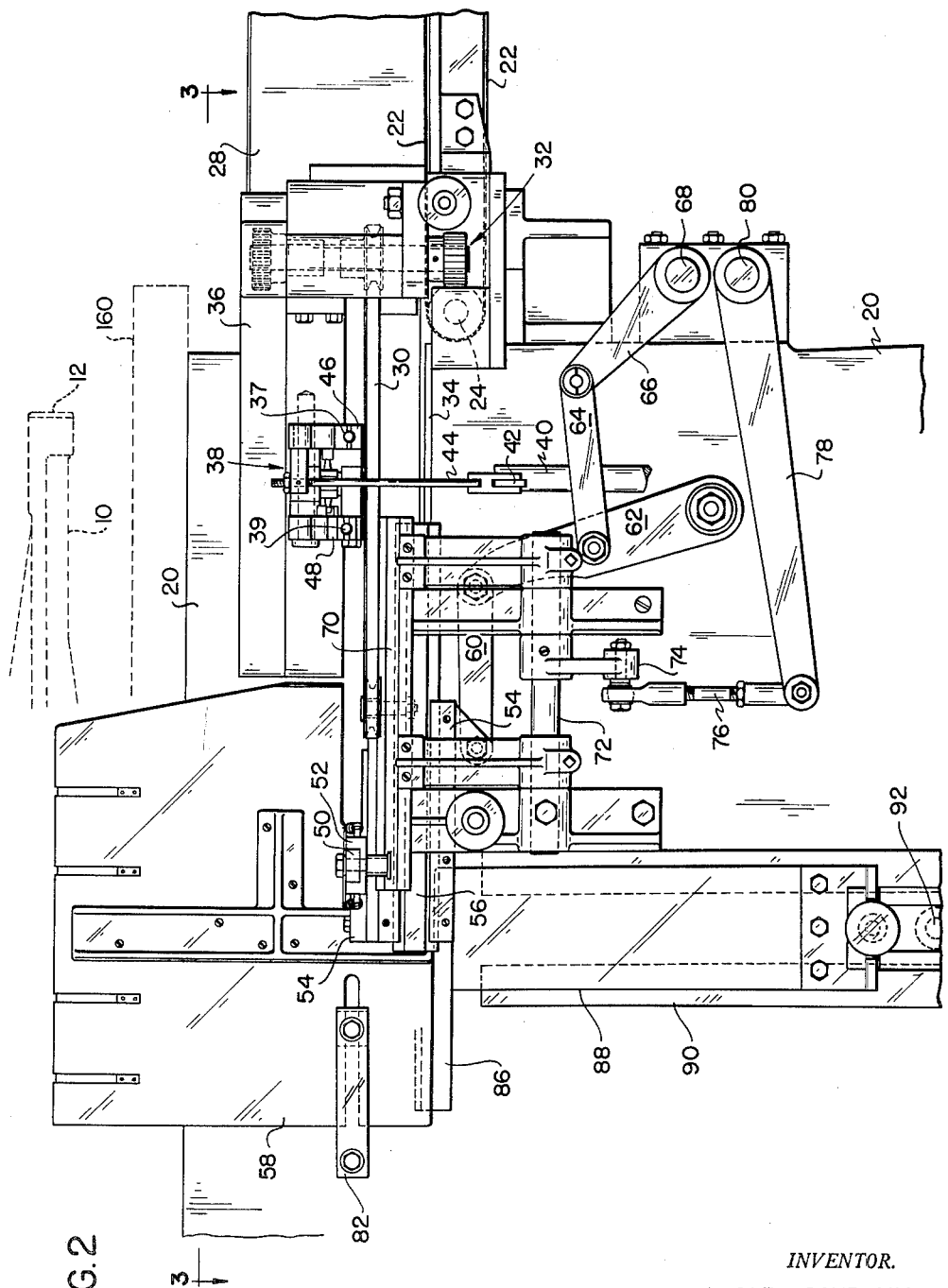
FIG. 2 is an enlarged fragmentary front elevational view of the machine showing the book feeding and loading mechanisms therefor.
Figure 3:
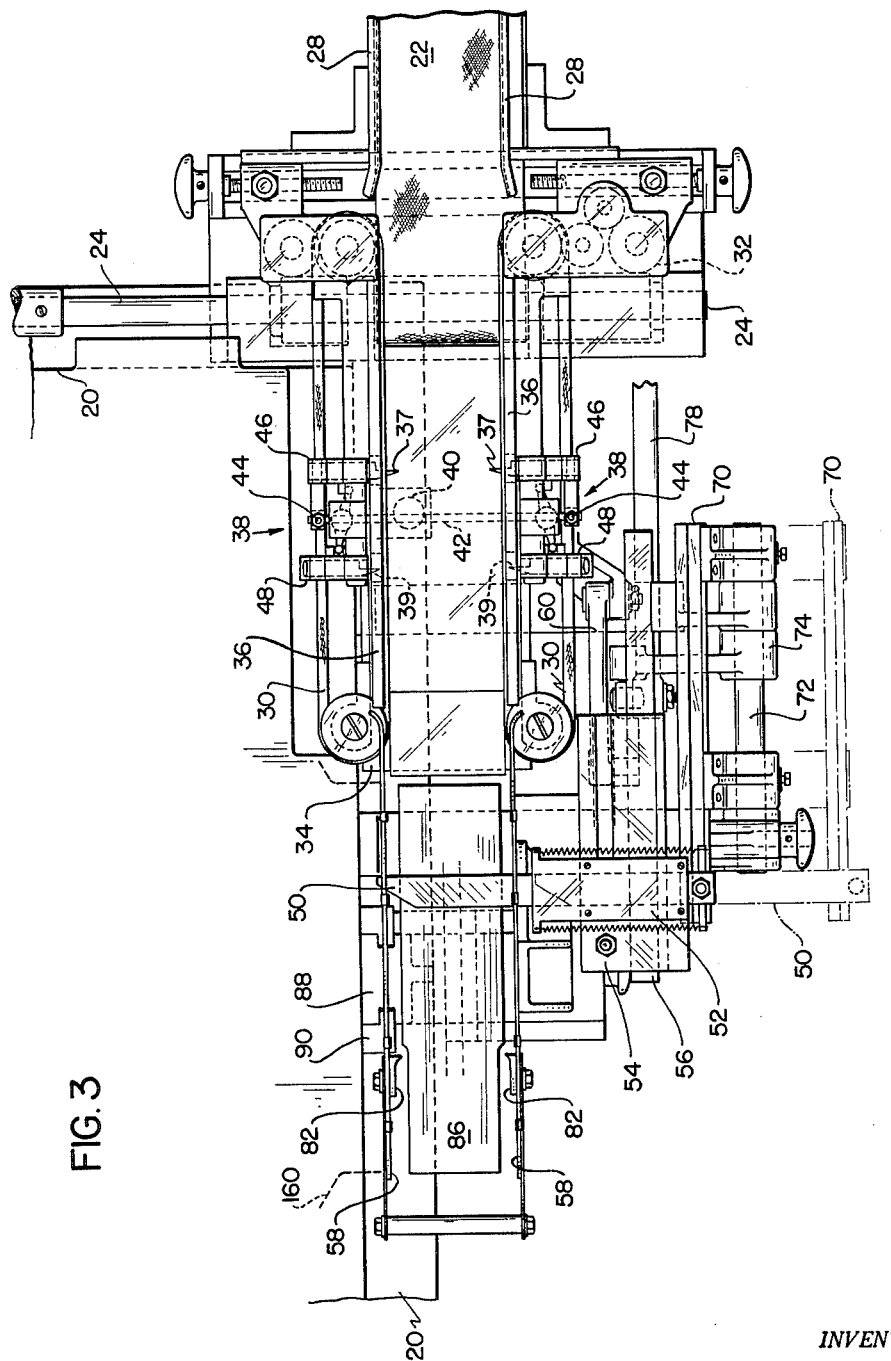
FIG. 3 is a horizontal section through the front portion of the machine providing a top view of the book feeding and loading mechanism as indicated by the line 3—3 of FIG. 2.

The books are transported to the front of the machine by conveyor and book feeding mechanisms and are then elevated to the loading station A by a loading mechanism which are shown in FIGS. 2 and 3. Included in the conveyor mechanism is a wide endless belt 22 which is disposed substantially horizontally to turn on horizontal axes and the top pass of which moves from right to left and then over a pulley which is secured to a shaft 24. The shaft 24 is mounted in suitable bearing blocks on the right-hand side of the machine frame 20, the shaft extending from the front to the rear of the machine. As shown in FIG. 11, a sprocket or pulley 26 is fixed to the rear end of the conveyor shaft 24 so that the said shaft may be rotated continuously when the machine drive motor (not shown) is energized and when suitable clutch means is actuated to connect the cam shaft with the drive motor.

The books are placed on the horizontal conveyor belt 22 manually or by suitable mechanism after they have been taken from a casing-in machine and after the covers have been applied thereto with a paste which has not yet set. The books are placed on the conveyor belt 22 in succession in edgewise fashion with the binding edge down, and suitable elongated plates 28 are supported longitudinally of the belt 22 to keep the books in edgewise position as they are transported longitudinally by the conveyor belt 22. The plates 28, 28 also serve to prevent two or more books being advanced in side-by-side relationship along the conveyor.

As each book approaches the pulley on the conveyor drive shaft 24, the sides of the cover thereof are engaged by endless belts 30, 30 on pulleys rotatable on vertical axes. The right-hand end pulleys for the belts 30, 30 are mounted on shafts which are rotated off the conveyor drive shaft 24, being connected therewith by suitable gearing indicated generally at 32. The belts 30, 30 advance the books in succession from right to left in a channel defined by a bottom plate 34 and by side plates 36, 36 mounted on the machine frame. While being advanced, the books are acted upon by a stop and escapement mechanism indicated generally by the reference numeral 38. Mechanism of this general type is shown in the Schramm Patent No. 2,785,812.

It is the purpose of the stop and escapement mechanism to permit only one book at a time to advance for loading and then only in timed relationship to the operation of the other mechanisms of the machine. The said stop and escapement mechanism includes a first pair of stop fingers 37, 37 movable into the conveyor channel from opposite sides thereof through suitable openings provided in the side plates 36, 36 and the mechanism also includes a second pair of stop fingers 39, 39 which are likewise movable through suitable openings in the side plates 36, 36. The stop fingers are moved into and out of the conveyor channel as a result of vertical reciprocation of a bar 40 to which a crosspiece 42 is secured and which at its ends is connected with rods 44, 44 extending upwardly to the stop and escapement mechanism. The first pair of stop fingers 37, 37 are mounted on a pair of pivotally supported holding members 46, 46, and the second pair of stop fingers 39, 39 are mounted on a pair of pivotally supported holding members 48, 48. The push rods 44, 44 are connected with the holders 46 and 48 so that as the bar 40 and the push rods are reciprocated vertically, the stop fingers are thrust into and out of the conveyor channel.

The finger holding members operate somewhat like bell cranks and they are so connected to the pair of push rods 44, 44 that when the first pair of stop fingers 37, 37 are thrust into the channel, the second pair of stop fingers on the holders 48, 48 are retracted from the channel. In each instance, the stop fingers are spring biased in their holders so as to be thrust resiliently into the channel. The operation of the stop and escapement mechanism is such that the first book traveling along the conveyor will engage and be stopped by the first pair of fingers 37, 37. Then, upon movement of the bar 40 and push rods 44, 44 upwardly, the first pair of stop fingers are retracted and the second pair of stop fingers 39, 39 are thrust into the channel to engage the leading edge of the book and prevent it moving farther. Then, upon movement of the bar and rods downwardly, the second pair of stop fingers 39, 39 are retracted and the first pair of stop fingers 37, 37 are thrust into engagement with the sides of the book cover as the book is moved toward the loading station by the conveyor belts 30, 30. After a book passes the first pair of stop fingers, the said fingers are spring pressed into the channel to prevent the next adjacent book from following the lead book on through.

Having passed the stop and escapement mechanism, the lead book is advanced by the conveyor belts 30, 30 to a position wherein it is engaged and further advanced by a transfer mechanism which includes a pusher finger 50 mounted in a cross slide 52. The finger and cross slide extend forwardly with respect to the machine or transversely with respect to the conveyor channel, and the finger is movable into and out of the said channel below the side plates 36, 36 thereof. The finger 50 is spring biased into the channel, and its cross slide 52 is mounted on a carriage 54 which is movable along a track or slide 56 extending longitudinally with respect to the conveyor channel. The carriage 54 is reciprocated on the slide 56 to advance the lead book from the conveyor channel into a loading position between a pair of plates 58, 58 relatively adjustably secured to the frame below the loading station A of the turret.

The means for reciprocating the carriage 54 comprises a plurality of pivotally connected links and levers designated by the reference numerals 60, 62, 64 and 66. The last mentioned element 66 is a lever which is secured to a shaft 68 rotatably supported on the right-hand end of the frame 20 and extending forwardly and rearwardly. The shaft 68 is oscillated on its axis by the drive and cam mechanism to be described hereinafter with reference to FIG. 11. The pusher or book feeding finger 50 is moved into and out of the conveyor channel by means of a shuttle frame structure 70 which is mounted for pivotal movement with a shaft 72 journaled on the main frame 20 and extending horizontally along the front wall thereof. The shaft 72 is oscillated to pivot the frame 70 forwardly and rearwardly and thus to move the pusher finger 50 outwardly and inwardly by means of a plurality of interconnected linkages including the crank 74, an adjustable link 76 and a lever 78 which is fixed at one end to a shaft 80. The shaft 80, like the previously mentioned shaft 68, is supported on the right-hand side of the main frame 20 to extend forwardly and rearwardly therealong, and the shaft 80 is also oscillated by the drive and cam mechanism to be described hereinafter.

In operation of the machine, the carriage 54 is drawn to the right (FIG. 2) toward the stop and escapement mechanism 38 to engage and advance the lead book which is transported through the said stop and escapement mechanism by the conveyor belts 30, 30. During such movement of the carriage 54, the frame structure 70 is pivoted forwardly to withdraw the finger 50 from the path of the lead book, and when the carriage 54 has been moved to the end of the stroke toward the stop and escapement mechanism, the shuttle frame 70 is pivoted rearwardly to permit the spring biased push finger 50 to be thrust into the conveyor channel behind the lead book. Then, the carriage 54 is thrust toward the left so that the finger 50 will push the lead book between the plates 58, 58. The leading edge of the book will engage an adjustable stop 82 disposed between the plates 58, 58. The stop structure 82 is, of course, adjusted to accommodate books of different size so that each book is properly located between the plates 58, 58 for elevation to the loading station A wherein the books are engaged and held by the presser units 16, 16.

When positioned between the plates 58, 58, the books rest upon the crosspiece 86 of a substantially T-shaped carriage or loader 88 which is mounted for vertical reciprocation in a slide 90. The bottom of the T-shaped loader is pivotally connected at 92 to the top of a push rod 94 (FIG. 11) which is also pivotally connected at its bottom end to a lever 96 which is secured to a shaft 98. The shaft 98 is journaled on the right-hand side of the frame 20 and extends forwardly and rearwardly therealong. The shaft 98 is oscillated by operation of the cam and drive mechanism as will hereinafter be described.

When the T-shaped carriage 88 of the loading mechanism is thrust upwardly from its bottom position shown in FIG. 2, it elevates the lead book from between the plates 58, 58 into position for engagement by the clamping plates or jaws of the presser unit located at the loading station A of the turret.

*The presser units*

In now describing a presser unit 16 and the manner in which it is operated to engage and move the lead book from the loading station A through the various other stations of turret operation, reference will be had to FIGS. 1, 4 and 5. The presser unit includes a casting which is generally L-shaped in cross section or when viewed from the side thereof as in FIG. 5, the said casting providing a bottom plate 100 and a vertical plate 102. The bottom plate 100 is horizontally disposed and is secured as by a plurality of bolts 104, 104 to the top surface of the turret gear 10 adjacent the periphery thereof. The vertical plate 102 constitutes the inner clamping plate or jaw of the presser unit, the said plate being disposed in a vertical plane normal to the turret gear radius which coincides with the center line of the presser unit.

The casting also defines a pair of sleeve bosses 106, 106, one at each side of the clamping plate 102. The right-hand sleeve 106, when viewed while facing toward the axis of the turret from the periphery thereof, is higher than the left-hand sleeve 106 so that operating clearance is provided for adjacent presser units on the turret gear. The said sleeves slidably receive a pair of rods 108, 108 which extend horizontally in planes parallel to the radial plane of the turret wherein the center line of the presser unit is disposed. The end portions of the rods 108, 108 which extend generally radially outwardly of the turret structure are provided with serrations 110,110 which are engaged by suitable clamps 112, 112 to adjustably connect an outer clamping plate or jaw 114 to the presser unit. Like the inner plate 102, the outer clamping plate 114 is disposed in a vertical plane normal to the center line of the presser unit. By adjusting the position of the outer presser plate 114 on the outwardly projecting end portions of the rods 108, 108, the presser unit is adjusted to accommodate books of different bulk or thickness. The outer plate 114 is biased toward the inner plate 102 to clamp the sides of a book therebetween by means of springs 116, 116 which are seated between the sleeves 106, 106 and collars 118, 118 secured to the rods 108, 108 adjacent the inner ends thereof. Therefore, in order to open the clamping plates or jaws 102 and 114, it is necessary to move the rods 108, 108 outwardly against the force of the springs 116, 116. The presser units are opened in the present construction by the provision of means engaging the inner ends of the rods 108, 108 and thrusting them outwardly.

The actuating mechanism for thrusting the spring rods 108, 108 to open a presser unit 16 includes a plunger 120 which is vertically reciprocable on the axis of the turret, the plunger 120 being movable through the central opening of the turret gear 10. A grooved collar 122 is secured to the top end portion of the plunger 120 and it receives within its groove a roller 124 which is rotatable on the end of a bell crank 126. The bell crank 126 is pivoted at 128 to the end of an arm 130 formed as a part of a sleeve bushing 132 for the plunger 120 and which bushing is secured in a plate 134 rigidly disposed over the rotatable turret gear 10. The other end of the bell crank 126 is journaled in a pillow block 136 which is disposed in a recess in the top surface of a carriage 138. The carriage 138 is reciprocable radially of the machine, the said carriage being mounted in a slide formed on the plate 134. A cross piece or cross bar 140 is secured to the radially outer end of the carriage 138 and a threaded stud 142 is secured in each end of the cross bar 140. The studs 142, 142 are adjustably located in the cross bar 140 to engage the inner ends of the spring rods 108, 108 of the presser unit and to thrust the said spring rods outwardly whereby to open the clamping jaws of the presser unit when the carriage 138 is moved radially outwardly with respect to the turret. As will be observed with reference to FIG. 5, when the plunger 120 is thrust downwardly, the bell crank 126 is pivoted clockwise and the carriage 138 is thrust radially outwardly to cause the presser unit 16 to open. Obviously, only the outer clamping plate or jaw 114 of the presser unit is moved in this operation.

There are three sets of presser unit actuating mechanisms provided, one such set being provided to open a presser unit located at each of the stations A, B and I which are, respectively, the loading station, the forming station and the unloading station. Therefore, each of the presser units 16, 16 located at each of the three stations is opened at the same time. They are closed by their respective springs 116, 116 when the plunger 120 is thrust upwardly.

Obviously, it is the purpose of opening the presser unit 16 at the loading station A to permit the book loading mechanism to thrust a book upwardly between the clamping plates or jaws 102 and 114 of the presser unit located at the A station. The plunger 120 is moved downwardly and then shifted upwardly while the turret is at rest, with the presser units located at the various stations. Thus, the jaws of the presser unit at the loading station are opened to receive a book and are then closed to clamp the book between the said jaws and to apply pressure to the sides of the cover thereof over the entire surface of the end sheets of the book. After the book has been clamped in the loading station, the turrent is indexed so that the presser unit with clamped book therein is moved from the loading station A to the forming station B. At the forming station B, the jaws of the presser unit are opened to permit the forming apparatus to engage and form the book as will hereinafter be described.

*The creaser units*

A creaser unit 144 (FIGS. 6, 7 and 8) is located at the B station to engage the book joints while the book is being formed, and similar creaser units are located at each of the stations C through H. The creaser units are fixedly located at the stations B through H, with the center line of each creaser unit coinciding with the radial location or plane of the said stations. As best shown in FIG. 7, the creaser unit includes two jaws 146 and 148 which are relatively movable longitudinally of the creaser unit or radially of the machine and which have facing edges adapted to engage a book along the joints thereof. It will be observed that a book is held in a presser unit so that the binding edge portion thereof, including the joint area and center board or back-strip area of the cover, is exposed below the presser jaws 102 and 114, and a presser unit 16 is disposed over a creaser unit 144 when located at each of the stations B through H.

Each of the creaser jaws 146 and 148 is mounted on a heating plate 150 wherein heater elements 152, 152 are disposed to heat the jaws 146 and 148 whereby to apply heat to the book joints as pressure is applied thereto by the said creaser jaws. The heating elements 152, 152 are preferably of the electrical resistance type and are conventionally wired for thermostatic control and manual adjustment of the temperature applied to the book joints at each creaser unit at each of the several stations. The heater plates 150, 150 are respectively secured to inner and outer jaw carriers 154 and 156 and the jaws 146 and 148 are located so that their opposed horizontal joint-engaging edges are disposed in vertical planes normal to the center line of the creaser unit. The jaw carrier 154 is slidable radially inwardly and outwardly of the machine along the center line of the creaser unit between a pair of slide rails or gibs 158, 158 secured to the top surface of a horizontally disposed plate 160 which is rigidly mounted on the top of the machine frame 20 and which has a central opening receiving the presser unit actuating plunger 120 within a sleeve 162 which is the bushing for the turret gear 10. The jaw carrier 154 is biased radially inwardly of the machine or in a book disengaging direction by a pair of springs 164, 164 which are located outside of the slide rails 158, 158 and which are connected at pins 166, 166 to the plate 160 and at pins 168, 168 to the carrier 154, the pins 168, 168 extending horizontally through suitable slots provided in the slide rails 158, 158.

The jaw carrier 154 is thrust radially outwardly of the machine to effect engagement of the creaser jaw 146 with a book supported in a presser unit by cam operated means. The said cam operated means includes a pair of bell cranks 170, 170 which are keyed or otherwise secured to a shaft 172 journaled in the frame 20 below the horizontal plate 160. One end of each bell crank 170 projects through a suitable opening in the plate 160 and engages a pillow block 174 pivotally supported on the inner end of the carrier 154, there being two such pillow blocks 174, 174 disposed between the slide rails 158, 158. The other end of one of the bell cranks is formed as a gear segment and is engaged with the gear segment end of a bell crank 176 which is pivotally mounted on a shaft 178 supported by the frame 20 below the plate 160. The other end of the bell crank 176 rotatably supports a follower roller 180 which engages a cam 182 vertically movable with a sleeve 184 surrounding the sleeve 162 which in turn surrounds the presser unit actuating plunger 120. The sleeve 184 is reciprocated vertically by the drive mechanism to be described in connection with FIG. 11. As will be noted by the shape of the cam 182 in FIG. 7, the bell crank 176 is rotated clockwise and the bell cranks 170, 170 are rotated counterclockwise to thrust the creaser jaw 146 toward engagement with a book held by a presser unit when the sleeve 184 is elevated. When the sleeve 184 is thrust downwardly, the jaw 146 is moved out of engagement by the force of the springs 164, 164.

Like the carrier 154, the carrier 156 for the creaser jaw 148 is slidable radially of the machine. The carrier 156 is adjustably mounted on a channel-like bar 186 which is free to slide within the inner jaw carrier 154 radially inwardly and outwardly of the machine. A pair of springs 188 bias the bar 186 and jaw carrier 156 radially inwardly of the machine, the springs being connected at one end to pins 190, 190 which are rigidly secured to the periphery of the fixed plate 160, and the springs are connected at the other end to horizontally disposed pins 192, 192 which are secured to the said channel-like bar 186. It will be observed that the jaw carrier 156 has a bracket 194 provided thereon and which rotatably supports a feed screw 196 threaded into the outer end of the bar 186. By applying a suitable tool to the end 198 of the feed screw, the jaw carrier 156 can be adjusted longitudinally of the bar 186 for the purpose of adjusting the clamping force of the creaser jaws and for adjusting them to books of different bulk or thickness. Obviously, the clamping force applied to a book by the creaser jaws is determined by the force of the springs 188, 188, since the inner creaser jaw 146 is thrust outwardly by the cam means described above and since the outer creaser jaw is biased toward the inner creaser jaw by the said springs.

The outer jaw carrier 156 and outer creaser jaw 148 are moved radially outwardly of the machine or away from book engagement by cam means. The said cam means is similar to the cam means used to move the inner creaser jaw and includes a bell crank 200 which is rotatably mounted on the shaft 172 below the plate 160 and which has one end projecting through a suitable opening in the said plate. The said one end engages a pillow block 202 which is pivotally supported in the radially inner end of the bar 186. The other end of the bell crank 200 is formed as a gear segment and is engaged by the gear segment end of a bell crank 204 pivotally mounted on the shaft 178. The other end of the bell crank 204 has a follower roller 206 mounted thereon for engagement with a cam 208 which is vertically reciprocable with the sleeve 184 surrounding the turret axis. It will be observed with reference to FIG. 7 that when the sleeve 185 is elevated, the bell crank 204 rotates counterclockwise and the bell crank 200 rotates clockwise whereby the springs 188, 188 draw the jaw carrier 156 and outer creaser jaw 148 radially inwardly of the machine to engage a book. When the sleeve 184 is moved downwardly, the bell cranks 204 and 200 are pivoted clockwise and counterclockwise, respectively, and the bar 186, the jaw carrier 156 and the outer jaw 148 are moved radially outwardly of the machine away from the book held in a presser unit.

*The book forming mechanism*

As previously mentioned, the first creaser unit 144 to engage a book held by a presser unit is that creaser unit located at the B station or book forming station. In FIG. 9, the said first creaser unit is shown with a presser unit 14 located thereover and supporting a book which is engaged by the jaws of the said creaser unit. At the B station or book forming station, the presser unit actuating mechanism is operated to open the presser jaws sufficiently to at least relax the clamping force applied through the book cover to the end sheets of the book. However, the creaser unit 144 is actuated by moving the sleeve 184 upwardly and by operation of the associated bell cranks to cause the creaser unit jaws to engage the book at its joints just prior to the time that the presser unit jaws are separated. Thus, the book is held in position as shown in FIG. 9. Then, the book is formed by forcing a forming bar 210 downwardly on the exposed upper edge thereof. The forming bar 210 is provided with a convex bottom surface and is of sufficient length to extend over any books to be operated upon by the machine.

The forming bar 210 is connected to the bottom edge portion of a plate 212 which is secured in a bracket 214 slidable in a horizontal cross slide 213 which is secured to a bar 215 slidable vertically in a slide 216. The slide 216 is rigidly supported in a vertical position as by bracket means 218 connected to the frame 20, and the slide bar 215 is connected by a suitable link or arm (not shown) to the end of a lever 220 (FIG. 11) whereby it is reciprocated vertically by the feed mechanism to be described.

When the bar 215 and former carrier 214 are thrust downwardly, the convex bottom surface of the former bar 210 shapes the exposed edge of the book as desired, forcing the back edges of the sheets of the book against the center board or backstrip of the cover, the creaser jaws 146 and 148 being engaged in the book joints to prevent the entire book from being forced downwardly. It will be seen that the forming will be accomplished even with a rough trimmed book. The former bracket or carrier 214 can be adjusted manually on the cross slide 213 by means of a feed screw 222 (FIG. 9) to adjust it for books of different bulk or thickness.

It has been found that only one forming operation performed at the station B is necessary to complete the book forming in the operation of the machine of this invention. At each of the subsequent stations C through H, creaser units are located and creaser jaws engage the joints of the book to apply heat and pressure thereto, the heat serving to dry or set the paste and the pressure serving to maintain the book form and shape while the paste dries. Additionally, pressure is continuously maintained by the clamping plates of the presser unit over substantially the entire area of the end sheets of the book during all operation of the turret in movement from the station B to the unloading station I wherein the clamping plates are opened to release the fully formed and pressed book.

In passing between stations, the bottom or binding edge of the book is passed over a plurality of rolls such as the roll 224 shown in FIG. 10. There are preferably three such rolls provided, one of which is engaged by the book in movement of a presser unit from the C station to the D station, one is engaged in movement from the E station to the F station, and one is engaged in movement from the G station to the H station.

As shown in FIG. 10, the roll 224 is rotatable on a shaft 226 which is journaled in a fork 228 vertically movable in a bracket 230 and thus the roll 224 is biased upwardly by one or more springs 232 whereby the periphery of the roll is forced into engagement with the center board or backstrip area of the book cover as the presser unit moves over the roll. Preferably, the roll 224 is made of soft rubber which is hollow and filled with air so that no great pressure is exerted against the book, the purpose of the pressure being merely to force the centerboard or backstrip of the cover into engagement with the book without changing the book form as set at the B station. The rolls 224, 224 smooth the cover in the centerboard or backstrip area to prevent the formation of any undesirable wrinkles or creases therein.

When a presser unit has completed a cycle in movement from the loading station or A station to the unloading station or I station, the jaws or clamping plates thereof are opened by operation of the presser unit actuating mechanism whereby the book is released to fall or slide onto the chute 18 from which it can be removed or conveyed manually or by suitable mechanism. There is the possibility that a book may tend to stick to one or the other of the presser unit clamping plates in the unloading station and not fall or slide onto the chute. Therefore, a positive ejector or unloader is preferably provided. The ejector comprises means very similar in construction and in operation to the book former shown in FIG. 8 and described in connection therewith. The ejector can be mounted in a slide 234 secured to the frame 20 adjacent the unloading station I as shown in FIG. 1. The ejector can be moved substantially simultaneously with the book former and in substantially the same manner to push a book downwardly from between the separated jaws of the presser unit in the unloading station.

*The drive mechanisms*

As previously mentioned, the book forming and pressing machine of this invention is preferably driven by an electric motor and the drive and motion transmitting mechanism includes a plurality of cams and levers. The drive motor is not shown in FIG. 11, but it is to be connected as by belt and pulley means to a driven shaft 236 extending from the rear wall of the frame 20 through the front wall thereof. A gear 238 is secured to the shaft 236 adjacent the rear wall of the frame and it engages the first gear of a train 240 ending in a large diameter gear 242 secured to a cam shaft 244. The cam shaft 244 is disposed horizontally and is journaled in the front and rear walls of the frame 20. The cams are not shown in FIG. 11, but for the most part they comprise internal or closed cams rotatable with the shaft 244.

While no clutch mechanism is shown, a conventional clutch structure is preferably provided in the transmission whereby to provide selective engagement for the drive with the drive motor running. It is to be observed that the chain drive for the conveyor shaft 24 is taken from the gear train 240 so that the conveyor will operate continuously after the aforesaid clutch is engaged.

The rotating cams are engaged by a plurality of cam followers connected to a plurality of levers, some of which are pivotally supported on a left-hand lever shaft 246 and others of which are pivotally supported on a right-hand lever shaft 248. Both lever shafts are horizontally disposed and journaled in the frame 20 to extend forwardly and rearwardly therein.

As previously mentioned with respect to FIG. 1, the turret gear 10 is driven intermittenly in a counterclockwise direction when viewed from the top by means of a pinion 14 engaging the gear teeth formed on the rim or periphery of the turret gear. The pinion 14 is secured to the upper end portion of a vertically disposed shaft 250 which is connected at its lower end by means of a coupling indicated generally by the reference numeral 251 to a stub shaft 253 supporting a pinion 252 engaged by a reciprocable rack 254, the rack being reciprocable horizontally. The rack 254 is reciprocated by oscillatory movement of a lever 256 which at its upper end is pivotally connected to the right-hand lever shaft 248. An adjustable link 258 is connected between the rack 254 and the lower end of the lever 256, a pin and slot connection being provided between the said link and lever. The lever 256 is pivoted counterclockwise to move the rack 254 toward the right as viewed in FIG. 11, and it is pivoted clockwise to move the rack toward the left. A cam follower 260 supported on an appendage 262 from the lever 256 is engaged by a cam on the cam shaft 244 to effect the oscillatory movement of the lever 256. Obviously, the shaft 250 should be coupled to the pinion 252 and shaft 253 only when the rack 254 is moved from left to right whereby to provide the intermittent or indexed counterclockwise movement of the turret gear 10.

Therefore, the coupling 251 is to be engaged when the rack 254 is moved from left to right and it is to be disengaged when the rack 254 is moved from right to left. As shown in FIG. 11, the coupling comprises a top disk or flange 264 connected to the bottom end of the shaft 250 and it also includes a bottom disk or flange 266 connected to the top end of the stub shaft 253. The top disk carries with it a plurality of pins 268, 268 (preferably three) which are engageable within suitable apertures in the bottom disk 266 to effect a driving connection or coupling between the shafts 250 and 253. Thus, the top disk 264 must be lifted to withdraw the pins 268, 268 from the apertures in the bottom disk 266 when the rack 254 is being moved from right to left.

The means lifting the top disk 264 of the coupling 251 includes a lever 270 which is connected at its right-hand end to the shaft 98 for rotation therewith, the shaft 98 being journaled on the right-hand side of the frame 20 as previously mentioned. The left-hand end of the lever 270 is bifurcated and has a pair of rollers, such as the roller 272, engaged in the groove of a grooved collar 274 which is slidable on the shaft 250 and connected with the upper disk 264 of the coupling 251. Thus, in clockwise pivoting or rotational movement of the shaft 98 as viewed in FIG. 11, the lever 270 is pivoted clockwise and the coupling 251 is disengaged. Then, in counterclockwise pivoting movement or rotation of the shaft 98 and in counterclockwise pivoting movement of the lever 270, the coupling 251 is re-engaged.

The shaft 98 is oscillated by means of a crank 276 to which a link 278 is pivotally connected by means adapted to adjust the effective length of the crank arm 276. The link 278 is also connected to the end of a lever 280 pivotally supported on the right-hand lever shaft 248 and carrying a cam follower 282 which is engaged by a cam fixed for rotation with the cam shaft 244. When the cam lever 280 is pivoted clockwise, the crank arm 276 is pivoted counterclockwise to rotate the shaft 98 in a counterclockwise direction which affects engagement of the coupling 251. When the lever 280 is pivoted counterclockwise, the crank arm 276 is pivoted clockwise and the shaft 98 is pivoted clockwise to effect disengagement of the coupling 251. Obviously, the cams on the shaft 244 which operate the cam levers 256 and 280 are arranged with respect to each other so that the coupling 251 is disengaged while the rack 254 is moved from right to left and so that the coupling 251 is engaged while the rack 254 is moved from left to right. It is also obvious that the stroke of the rack 254 is adjusted by means of the adjustable link 258 to assure proper engagement and disengagement of the coupling pins 268, 268 with the apertures in the coupling disk 266.

As previously mentioned, the shafts 68 and 80 journaled on the right-hand side of the frame 20 are oscillated in timed relationship to each other to feed the books in sequence from the conveyor to a position for engagement by the loading mechanism for the presser unit at the loading station of the turret. The shafts 68 and 70 are to be rotated clockwise in timed relationship so that the book pushing finger 50 is withdrawn from the conveyor channel while its carrier 54 is moved toward the right (FIG. 2) to engage the finger behind the lead book in the conveyor. The shafts 68 and 70 are to be rotated in timed relationship in the counterclockwise direction to permit the spring loaded book pushing finger 50 to be thrust into the conveyor channel while the carrier 54 is thrust toward the left to advance the lead book into position for elevation by the loading mechanism.

The means for oscillating the shafts 68 and 80 in timed relationship includes a pair of levers, such as the lever 284, which is pivotally supported on the left-hand lever shaft 246. Only one of the said levers can be seen in FIG. 11 because the said levers overlie each other in the plane of the drawing. However, each lever supports a cam follower 286 engaged by a cam rotated with the cam shaft 244. An end of one lever, such as the lever 284, is pivotally connected to a link 288 which is conected to the end of a crank arm 290 for the shaft 68 and the end of the other said levers is connected to a link 292 which is also connected to a crank arm 294 for the shaft 80. When the pair of levers, such as the lever 284, are pivoted clockwise, the shafts 68 and 80 are rotated in the counterclockwise direction to advance a book from the conveyor to position for engagement with the book loading mechanism. When the pair of levers, such as the lever 284, are pivoted in the counterclockwise direction, the shafts 68 and 80 are rotated in the clockwise direction to withdraw the book pushing finger 50 from the conveyor channel and to move its carrier 54 toward the right (FIG. 2) to engage another book in the conveyor channel.

Obviously, the cams operating the book feeding shafts 68 and 80 through the aforedescribed lever mechanism must be arranged on the cam shaft to time the book feeding operation to operation of the book elevating or loading mechanism. As previously described, the book loading mechanism comprises the T-shaped loader 88 which is moved on the vertically disposed slide 90. As was also described, the T-shaped loader 88 is reciprocated vertically by pivoting movement of the lever 96 which is connected to the member 88 by means of the adjustable link 94. The lever 96 is secured to the shaft 98 so that it is pivoted clockwise to elevate a book to a presser unit at the loading station A while the turret drive coupling 251 is disengaged. Also, the book loading member 88 is pulled downwardly by counterclockwise pivoting movement of the lever 96 occurring while the turret drive coupling 251 is engaged.

Accordingly, the book loading mechanism is operated in timed relationship to turret operation, a book being loaded while the turret is at rest. The book loading mechanism is also operated in timed relationship to the book feeding mechanism, a book being fed to the loading mechanism while the loader 88 is in its bottom position and while the turret is being moved from station to station. The proper timing is, of course, achieved by adjusting the rotated positions of the various operating cam means on the cam shaft 244.

It is also essential that the stop and escapement mechanism 38 (FIGS. 2 and 3) be operated in timed relationship to the book feeding mechanism and to the book loading mechanism. As previously mentioned, the escapement mechanism 38 is actuated by vertical reciprocation of the bar 40. The bar 40 is reciprocated in timed relationship to operation of the loading mechanism by means of a bell crank 296 which engages the bottom end portion of the bar 40 and which is operated by a cam 298 carried on the lever 96 operating the loading mechanism. As shown in FIG. 11, clockwise pivoting movement of the loading mechanism lever 96 causes clockwise pivoting movement of the bell crank 296 and downward movement of the bar 40. When the loading mechanism lever 96 is pivoted counterclockwise, the bar 40 is thrust upwardly by a spring 300 seated on a bushing or bracket 302 for the said bar and engaging a collar 304 fixed to the bar.

When the bar 40 is thrust downwardly, the stop and escapement mechanism 38 is operated to permit the lead book to be advanced by the conveyor belts 30, 30 to a position wherein it can be engaged by the book pushing or feeding finger 50 for advancement to the position for engagement by the loading elevator 88. Such movement of the bar 40 and operation of the stop and escapement mechanism 38 occurs while the preceding book is being elevated to the loading station of the turret. Upon downward movement of the book elevator or loader, the bar 40 is thrust upwardly and the stop and escapement mechanism is operated to prevent movement of a subsequent book along the conveyor toward the loading mechanism.

Now, it is also obvious that the presser unit actuating mechanism described with reference to FIGS. 3 and 4 must be operated in timed relationship to turret operation, the presser unit actuating mechanism at each of the three stations A, B, and I being operated to open the presser units located at the said stations while the turret is at rest. As previously mentioned, the presser unit actuating mechanism includes the elongated plunger or shaft 120 which is reciprocable vertically on its axis or center line. The bottom end portion of the plunger 120 is provided with a groove wherein rollers are received and which are journaled in the bifurcated end of a lever 306 which is pivotally supported at its other end on a short lever shaft 308 supported adjacent the right-hand end of the frame 20 and extending horizontally forwardly and rearwardly therein. The lever 306 carries a cam follower 310 whereby the said lever is oscillated on the shaft 308 as a result of rotation of a suitable cam fixed to the cam shaft 244. When the lever 306 is pivoted counterclockwise, the plunger 120 is thrust downwardly to open the jaws of the presser units at the stations A, B, and I, this occurring while the turret is at rest and while the book loading mechanism is elevating a book toward the loading station A. The cam follower 310 engages an external cam which holds the presser unit actuating plunger 120 downwardly to open the presser unit jaws for only a relatively brief interval, and after passage of the cam, the plunger 120 is promptly elevated by a pair of springs one of which is designated by the reference numeral 312. Thus, the presser unit jaws are opened and then closed while the turret is at rest.

The creaser unit jaws at each of the creaser units at the stations B through H are closed and then opened substantially simultaneously with opening and closing movement of the presser units at the stations A, B and I. As previously described with reference to FIGS. 6, 7 and 8, the creaser unit jaws at each of the aforesaid stations are actuated by vertical reciprocation of the sleeve 184. When the sleeve 184 is elevated, the creaser jaws engage a book at each of the stations B through H and when the sleeve 184 is thrust downwardly, the creaser jaws disengage. The means for vertically reciprocating the sleeve 184 includes a lever 314 which is pivotally connected to the right-hand lever shaft 248. Preferably, there are two such levers provided, each having a roller 316 engaged within a groove provided externally of the sleeve 184 at the bottom end portion thereof. Each lever 314 carries a cam follower 318 engaged by a suitable cam rotatable with the cam shaft 244. When the levers 314, 314 are pivoted clockwise, the sleeve 184 is elevated to cause the creaser unit jaws to engage the books at the forementioned stations having creaser units. When the lever 314 is pivoted counterclockwise, the sleeve 184 is thrust downwardly to disengage the creaser unit jaws.

While the presser units are opened and while the creaser units are closed, the forming mechanism is actuated to engage the forming bar 210 with a book held by the creaser unit at the B station or forming station as previously described with reference to FIG. 9. The means for reciprocating the bar 215 in the forming unit slide 216 comprises the long lever 220 which is pivotally connected at its left-hand end to the lever shaft 246. As previously mentioned, a link (not shown) is connected between the lever 220 and the bottom end portion of the bar 215. The lever 220 carries a cam follower 320 which is engaged by a suitable cam fixed for rotation with the cam shaft 244. When the lever 220 is pivoted clockwise, the former unit is actuated to engage the forming bar 210 with a book at the forming station B. When the lever is pivoted counterclockwise, the forming bar 220 is elevated out of engagement with the book at the forming station.

At substantially the same time that the forming mechanism is actuated, a generally similar mechanism can be operated to eject a book from the loading station I as hereinbefore set forth. A lever 322 is pivotally connected to the right-hand lever shaft 248 and carries a suitable cam follower so as to be pivoted counterclockwise to eject a book and clockwise to withdraw the ejecting means from between the jaws of the presser unit at the unloading station I.

*A summary of operation*

In summarizing operation, it is to be assumed that a plurality of books are placed in longitudinal edgewise alignment on the conveyor belt 22 with their binding edges down. The succession of books are advanced longitudinally by the belt 22 until they reach the side belts 30, 30 which continue to advance the books to the stop and escapement mechanism 38. During such conveyor operation, the other mechanisms of the machine are operating in timed relationship.

At the stop and escapement mechanism, the leading edge of the lead book in the succession is engaged and held by the first pair of stop fingers 37, 37 and/or by the second pair of stop fingers 39, 39 and then released for further advance by the side belts 30, 30 only when the transfer mechanism has moved as though to advance a book from the conveyor to the loader. Thus, the stop and escapement mechanism prevents the transfer mechanism from moving more than one book at a time to the loader. The timing of the stop and escapement mechanism is fairly critical, but it can be timed to release a book while the transfer or pusher finger 50 is well on its way toward the loader, or while it is at the loader, or while it is returning toward the stop and escapement.

The timing of the transfer mechanisms is also critical. That is, it is to move a book from the conveyor to the loader 88 so as to reach the loader only when it is in its bottom position. The loader reaches its bottom position once for each indexed movement of the turret, and it is elevated to reach the top position wherein a book can be clamped by a presser unit only when a movement of the turret has been completed and a presser unit at the loading station A has been opened.

When the presser unit at the loading station closes upon the book elevated by the loader, the loader descends and in the next movement of the turret, the said presser unit with the book retained therein is shifted to the forming station B. At the forming station, the first creaser unit comes into play to engage the cover joints and apply heat thereto for the first time. While the creaser unit is closed the presser unit is opened, and the forming bar 210 engages the book to form its edges as desired. The presser unit clamping plates are not widely separated from the cover at the forming station, being opened sufficiently to permit shifting of the book sheets while preventing bulging of the sides of the cover. After movement of the forming bar downwardly and upwardly, the presser unit is again closed to retain the book and exert continuous pressure thereon by means of its clamping plates, and the creaser unit is then opened.

The pressure applied by the presser unit is not relaxed during movement of the turret through the next six stations C through H. At each of the said stations, a creaser unit is closed to crease the cover joints and to apply heat thereto, and then each creaser unit is opened to permit further movement of the book with the presser unit in which it is held.

Having passed the stations C through H, the presser unit and retained book reach the unloading station I where, like the loading station, there is no creaser unit. At the unloading station the presser unit is opened and the book falls onto a chute or conveyor for removal from the machine. When removed, the book is fully formed and pressed and creased and the paste securing the cover to the book has set.

While the foregoing summary of operation relates to the handling of one book, it is to be understood that the machine operates simultaneously upon a plurality of books. That is, a book is fed and loaded into each presser unit reaching the loading station and the loaded books then pass in succession through each of the other stations, a presser unit advancing one station for each movement of the turret.

The invention claimed is:

1. In a rotary machine for acting upon a succession of books having covers pasted thereto but with the paste initially not set, the combination comprising a rotatable turret which rotates on a substantially vertical axis, a plurality of presser units mounted on said turret in circumaxially spaced relationship each having a pair of opposed relatively movable clamping plates to engage substantially the entire area of the sides of a book cover and each unit having means for applying continuous pressure to a book through its clamping plates, mechanism for intermittently rotating the turret so as to position each of the presser units in succession at each of a plurality of stations during one revolution of the turret, a creaser unit having a pair of opposed relatively movable creaser jaws engageable with the book cover to crease its joints at at least one of the said stations, mechanism operable to close and then open the creaser jaws, and mechanism operable to open the clamping plates of a presser unit to accommodate book movement therebetween.

2. A rotary machine for acting upon a succession of books as set forth in claim 1 wherein the mechanism for opening the clamping plates of a presser unit is constructed and arranged to open said clamping plates at one of the said stations and the mechanism for closing and opening the creaser jaws is constructed and arranged to do so at another of the said stations.

3. In a rotary machine for acting upon a succession of books having covers pasted thereto but with the paste initially not set, the combination comprising a turret rotatable on a substantially vertical axis, a plurality of presser units mounted on said turret in circumaxially spaced relationship each having a pair of opposed relatively movable clamping plates to engage substantially the entire area of the sides of a book cover and each unit having means for applying continuous pressure to a book through its clamping plates, mechanism for intermittently rotating the turret so as to position each of the presser units in succession at each of a plurality of stations during one revolution of the turret, a creaser unit located at each of a plurality of the said stations, each creaser unit having a pair of opposed relatively movable creaser jaws engageable with the cover of a book held by a presser unit at the associated station to crease the cover joints, mechanism operable to close and then open the creaser jaws in each creaser unit while the turret is at rest, and mechanism operable to open the clamping plates of a presser unit to accommodate book movement therebetween.

4. In a rotary machine for acting upon a succession of books having covers pasted thereto but with the paste initially not set, the combination comprising a rotatable turret which rotates on a substantially vertical axis, a plurality of presser units mounted on said turret in circumaxially spaced relationship each having a pair of opposed relatively movable clamping plates to engage substantially the entire area of the sides of a book cover and each unit having means for applying continuous pressure to a book through its clamping plates, mechanism for intermittently rotating the turret so as to position each of the presser units in succession at each of a plurality of stations during one revolution of the turret which stations include a loading station, a creaser unit located at each of a plurality of the said stations, each creaser unit having a pair of opposed relatively movable creaser jaws engageable with the cover of a book held by a presser unit at the associated station to crease the cover joints, mechanism operable to close and then open the creaser jaws in each unit while the turret is at rest, and mechanism operable to open the clamping plates of each presser unit at the loading station to accommodate book movement between the clamping plates.

5. In a rotary machine for acting upon a succession of books having covers pasted thereto but with the paste initially not set, the combination comprising a rotatable turret which rotates on a substantially vertical axis, a plurality of presser units mounted on said turret in circumaxially spaced relationship each having a pair of opposed relatively movable clamping plates to engage substantially the entire area of the sides of a book cover and each unit having means for applying continuous pressure to a book through its clamping plates, mechanism for intermittently rotating the turret so as to position each of the presser units in succession at each of a plurality of stations during one revolution of the turret which stations include a loading station and an unloading station, a creaser unit located at each of a plurality of the said stations but not including the unloading station, each creaser unit having a pair of opposed relatively movable creaser jaws engageable with the cover of a book held by a presser unit at the associated station to crease the cover joints, mechanism operable to close and then open the creaser jaws in each unit while the turret is at rest, and mechanism operable while the turret is at rest to open and then close the presser unit clamping plates at the loading and at the unloading stations, whereby the machine is adapted to receive and to discharge books.

6. In a rotary machine for acting upon a succession of books having covers pasted thereto but with the paste initially not set, the combination comprising a turret rotatable on a vertical axis, a plurality of presser units mounted on said turret in equal circumaxially spaced relationship each having a pair of opposed relatively movable clamping plates to engage substantially the entire area of the sides of a book cover and each unit having means for applying continuous pressure to a book through its clamping plates, mechanism for intermittently rotating the turret so as to position each of the presser units in succession at each of a plurality of equally spaced stations during one revolution of the turret which stations include a loading station and an unloading station, a creaser unit located below a presser unit at each of a plurality of the said stations but not including the loading and the unloading stations, each creaser unit having a pair of opposed relatively movable creaser jaws engageable with the cover of a book held by a presser unit at the associated station to crease the cover joints, mechanism operable to close and then open the creaser jaws in each unit while the turret is at rest, and mechanism operable while the turret is at rest to open and then close the presser unit clamping plates at the loading and at the unloading stations, whereby the machine is adapted to receive and to discharge books by movement of a book upwardly to the presser unit at the loading station and by movement downwardly of a book from the presser unit at the unloading station.

7. A rotary machine for acting upon a succession of books as set forth in claim 6, wherein heating means is provided in each creaser unit to apply heat to the cover joints when the creaser jaws are engaged therewith.

8. In a rotary machine for acting upon a succession of books having covers pasted thereto but with the paste initially not set, the combination comprising a turret rotatable on a central substantially vertical axis, a plurality of presser units mounted on said turret in circumaxially spaced relationship each having a pair of opposed relatively movable clamping plates to engage the sides of a book cover and each unit having means for applying continuous pressure to a book through its clamping plates, mechanism for intermittently rotating the turret so as to position each of the presser units in succession at each of a plurality of stations during one revolution of the turret which stations include an unloading station, a creaser unit located at each of a plurality of the said stations, each creaser unit having a pair of opposed relatively movable creaser jaws engageable with the cover of a book held by a presser unit at the associated station to crease the cover joints, mechanism operable to close and then open the creaser jaws in each unit while the turret is at rest which mechanism includes cam means reciprocable along the axis of the turret and cam following motion transmitting means connected with the creaser jaws to effect relative movement thereof, and mechanism operable while the turret is at rest to open the presser unit clamping plates at the unloading station which mechanism includes an actuating plunger reciprocable along the turret axis and motion transmitting means connected with said plunger and at least one of the presser unit clamping plates to cause relative movement of the clamping plates.

9. In a rotary machine for acting upon a succession of books having covers pasted thereto but with the paste initially not set, the combination comprising a turret rotatable on a vertical central axis, a plurality of presser units mounted on said turret in circumaxially spaced relationship each having a pair of opposed relatively movable clamping plates to engage the sides of a book cover and each unit having means for applying continuous pressure to a book through its clamping plates, mechanism for intermittently rotating the turret so as to position each of the presser units in succession at each of a plurality of stations during one revolution of the turret which stations include an unloading station, a creaser unit located below a presser unit at each of a plurality of the said stations, each creaser unit having a pair of opposed relatively movable creaser jaws engageable with the cover of a book held by a presser unit at the associated station to crease the cover joints, mechanism operable to close and then open the creaser jaws in each unit while the turret is at rest which mechanism includes a cam sleeve reciprocable below the turret along the axis thereof and cam following motion transmitting means connected with the creaser jaws to effect relative movement thereof, and mechanism operable while the turret is at rest to open the presser unit clamping plates at the unloading station which mechanism includes an actuating plunger reciprocable above the turret along the axis thereof and motion transmitting means connected with said plunger and at least one of the presser unit clamping plates to cause relative movement of the clamping plates.

10. In a rotary machine for acting upon a succession of books having covers pasted thereto but with the paste initially not set, the combination comprising a rotatable turret which rotates on a substantially vertical axis, a plurality of presser units mounted on the said turret in circumaxially spaced relationship each having a pair of opposed relatively movable clamping plates to engage substantially the entire area of the sides of a book cover and each having means for applying continuous pressure to a book through its clamping plates, mechanism for intermittently rotating the turret so as to position each of the presser units in succession at each of a plurality of stations during one revolution of the turret which stations include a forming station, a creaser unit located at the said forming station and having a pair of opposed relatively movable creaser jaws engageable with the binding edge portion of the cover of a book held by the presser unit at the forming station to crease the cover joints, mechanism operable to close and then open the creaser jaws while the turret is at rest, mechanism operable to open and then close the presser unit clamping plates at the forming station, forming means for acting upon each book at the forming station including a forming bar engageable with the edge of a book opposite the binding edge, and mechanism operable while the turret is at rest to engage said forming bar with a book while the presser unit plates at the forming station are open and while the associated creaser unit jaws are closed to support the book.

11. A rotary machine for acting upon a succession of books as set forth in claim 10, wherein heating means is provided in the creaser unit to apply heat to the cover joints when the creaser jaws are engaged therewith.

12. In a rotary machine for acting upon a succession of books having covers pasted thereto but with the paste initially not set, the combination comprising a turret rotatable on a substantially vertical axis, a plurality of presser units mounted on the said turret in circumaxially spaced relationship each having a pair of opposed relatively movable clamping plates to engage substantially the entire area of the sides of a book cover and each having means for applying continuous pressure to a book through its clamping plates, mechanism for intermittently rotating the turret so as to position each of the presser units in succession at each of a plurality of stations during one revolution of the turret which stations include a forming station and a loading station, a creaser unit located at each of a plurality of the said stations including the said forming station, each creaser unit having a pair of opposed relatively movable creaser jaws engageable with the binding edge portion of the cover of a book held by the presser unit at the associated station to crease the cover joints, mechanism operable to close and then open the creaser jaws in each unit while the turret is at rest, mechanism operable to open and then close the presser unit clamping plates at the loading station and at the forming station to accommodate book movement between the clamping plates, forming means for acting upon each book at the forming station including a forming bar engageable with the edge of a book opposite the binding edge, and mechanism operable while the turret is at rest to engage said forming bar with a book while the presser unit plates at the forming station are open and while the associated creaser unit jaws are closed to support the book.

13. In a rotary machine for acting upon a succession of books having covers pasted thereto but with the paste initially not set, the combination comprising a turret rotatable on a substantially vertical axis, a plurality of presser units mounted on the said turret in circumaxially spaced relationship each having a pair of opposed relatively movable clamping plates to engage substantially the entire area of the sides of a book cover and each unit having means for applying continuous pressure to a book through its clamping plates, mechanism for intermittently rotating the turret so as to position each of the presser units in succession at each of a plurality of stations during one revolution of the turret which stations include an unloading station, a loading station and a forming station reached in succession in the order of mention, a creaser unit located at each of a plurality of the said stations including the said forming station but not including the unloading and loading stations, each creaser unit having a pair of opposed relatively movable creaser jaws engageable with the binding edge portion of the cover of a book held by the presser unit at the associated station to crease the cover joints, mechanism operable to close and then open the creaser jaws in each unit while the turret is at rest, mechanism operable to open and then close the presser unit clamping plates at the unloading, loading and forming stations, forming means for acting upon each book at the forming station including a forming bar engageable with the edge of a book opposite the binding edge, and mechanism operable while the turret is at rest to engage said forming bar with a book while the presser unit plates at the forming station are open and while the associated creaser unit jaws are closed to support the book.

14. In a rotary machine for acting upon a succession of books having covers pasted thereto but with the paste initially not set, the combination comprising a turret having a vertical axis, a plurality of presser units mounted on the said turret in circumaxially spaced relationship each having a pair of opposed relatively movable clamping plates to engage substantially the entire area of the sides of a book cover with the binding edge portion of the book exposed below the clamping plates and each unit having means for applying continuous pressure to a book through its clamping plates, mechanism for intermittently rotating the turret so as to position each of the presser units in succession at each of a plurality of stations during one revolution of the turret which stations include an unloading station, a loading station and a forming station reached in succession in the order of mention, a creaser unit located below a presser unit at each of a plurality of the said stations including the said forming station but not including the unloading and loading stations, each creaser unit having a pair of opposed relatively movable creaser jaws engageable with the exposed binding edge portion of the cover of a book held by the presser unit at the associated station to crease the cover joints, mechanism operable to close and then open the creaser jaws in each unit while the turret is at rest, mechanism operable while the turret is at rest to open and then close the presser unit clamping plates at the unloading, loading and forming stations, forming means for acting upon each book at the forming station including a vertically reciprocable forming bar engageable with the top edge of a book supported at the forming station, and mechanism operable while the turret is at rest to reciprocate said forming bar while the presser unit plates at the forming station are open and while the associated creaser unit jaws are closed to support the book.

15. In a rotary machine for acting upon a succession of books having covers pasted thereto but with the paste initially not set, the combination comprising a turret rotatable on a substantially vertical axis, a plurality of presser units mounted on the said turret in circumaxially spaced relationship each having a pair of opposed relatively movable clamping plates to engage substantially the entire area of the sides of a book cover to secure the book with its binding edge portion exposed and each unit having means for applying continuous pressure to a book through its clamping plates, mechanism for intermittently rotating the turret so as to position each of the presser units in succession at each of a plurality of stations during one revolution of the turret which stations include loading, forming and unloading stations, a creaser unit located at each of a plurality of the said stations not including the loading and unloading stations, each creaser unit having a pair of opposed relatively movable creaser jaws engageable with the binding edge portion of a book held by a presser unit at the associated station to crease the cover joints, mechanism operable to close and then open the creaser jaws in each unit while the turret is at rest, mechanism operable while the turret is at rest to open the pressure unit clamping plates at the loading and unloading stations, and a plurality of rolls secured to the machine each between successive stations having creaser units for engagement by the binding edges of the successive books during movements of the turret for the purpose of applying pressure to the backstrip area of the book covers.

16. In a rotary machine for acting upon a succession of books having covers pasted thereto but with the paste initially not set, the combination comprising a rotatable turret having a vertical axis, a plurality of presser units mounted on the said turret in circumaxially spaced relationship each having a pair of opposed relatively movable clamping plates to engage substantially the entire area of the sides of a book cover and each unit having means for applying continuous pressure to a book through its clamping plates, mechanism for intermittently rotating the turret so as to position each of the presser units in succession at each of a plurality of stations during one revolution of the turret which stations include a loading station and a station wherein the cover joints are creased, mechanism operable while the turret is at rest to open and then close the presser unit clamping plates at the loading station, means for feeding books in succession to the machine including a loader which is vertically reciprocable at the loading station between a bottom position and an elevated position wherein a book supported on said loader is positioned for engagement by the presser unit clamping plates at the loading station, and mechanism operable to move said loader from its bottom position so as to reach its elevated position while the turret is at rest and after the presser unit clamping plates at the loading station are opened.

17. In a machine for acting upon a book having a cover pasted thereto but with the paste initially not set, the combination comprising a presser unit having a pair of opposed relatively movable clamping plates to engage the sides of the book cover so that only the binding edge portion thereof is exposed below the said plates and having means for applying continuous pressure to the book over substantially the entire area of its end sheets through the said clamping plates and cover, a creaser unit adjacent and below said presser unit having a pair of opposed relatively movable jaws engageable with the binding edge portion of a book held by the presser unit to crease its cover joints, mechanism operable to close and then open said creaser jaws, mechanism operable to open and then close the presser unit clamping plates while the creaser unit jaws are closed, forming means for acting upon a book at the presser unit and creaser unit including a forming bar movable vertically for engagement with the edge of the book opposite the binding edge, and mechanism operable to engage said forming bar with the book while the presser unit plates are open and while the creaser unit jaws are closed to support the book.

18. In a rotary machine for acting upon a succession of books having covers pasted thereto but with the paste initially not set, the combination comprising a turret rotatable on a central substantially vertical axis, a plurality of presser units mounted on said turret in circumaxially spaced relationship each having a pair of opposed relatively movable clamping plates to engage the sides of a book cover and each having means for applying continuous pressure to a book through its clamping plates, mechanism for intermittently rotating the turret so as to position each of the presser units in succession at each of a plurality of stations during one revolution of the turret which stations include a loading station, a creaser unit located at each of a plurality of said stations and having a pair of opposed relatively movable creaser jaws engageable with the cover of a book held by a presser unit at the associated station to crease the cover joints, and mechanism operable while the turret is at rest to open the presser unit clamping plates at the loading station which mechanism includes an actuating plunger reciprocable along the turret axis and motion transmitting means connected with said plunger and at least one of the presser unit clamping plates to cause relative movement of the clamping plates.

References Cited in the file of this patent

UNITED STATES PATENTS

| | | |
|---|---|---|
| 2,635,262 | Schramm | Apr. 21, 1953 |
| 2,718,018 | Hildmann | Sept. 20, 1955 |
| 2,853,725 | Schoenberger | Sept. 30, 1958 |
| 2,878,496 | Terzuoli et al. | Mar. 24, 1959 |
| 2,893,022 | Schoenberger | July 7, 1959 |

FOREIGN PATENTS

| | | |
|---|---|---|
| 941,531 | France | July 19, 1948 |
| 1,128,886 | France | Aug. 27, 1956 |
| 774,266 | Great Britain | May 7, 1957 |